United States Patent
Savvides et al.

(10) Patent No.: US 8,861,800 B2
(45) Date of Patent: Oct. 14, 2014

(54) RAPID 3D FACE RECONSTRUCTION FROM A 2D IMAGE AND METHODS USING SUCH RAPID 3D FACE RECONSTRUCTION

(75) Inventors: Marios Savvides, Wexford, PA (US); Jingu Heo, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 299 days.

(21) Appl. No.: 13/186,057

(22) Filed: Jul. 19, 2011

(65) Prior Publication Data

US 2012/0183238 A1 Jul. 19, 2012

Related U.S. Application Data

(60) Provisional application No. 61/399,881, filed on Jul. 19, 2010.

(51) Int. Cl.
 G06K 9/00 (2006.01)
 A61B 3/10 (2006.01)
 G06T 17/00 (2006.01)

(52) U.S. Cl.
 CPC ............ *G06K 9/00201* (2013.01); *G06T 17/00* (2013.01); *G06K 9/00281* (2013.01)
 USPC .......................................... 382/118; 351/204

(58) Field of Classification Search
 None
 See application file for complete search history.

(56) References Cited

U.S. PATENT DOCUMENTS

| | | | | |
|---|---|---|---|---|
| 5,214,721 A * | 5/1993 | Fukuhara et al. | | 382/243 |
| 5,960,099 A * | 9/1999 | Hayes, Jr. et al. | | 382/118 |
| 6,044,168 A * | 3/2000 | Tuceryan et al. | | 382/118 |
| 6,434,278 B1 * | 8/2002 | Hashimoto | | 382/285 |
| 6,553,138 B2 * | 4/2003 | Rozin | | 382/154 |
| 6,643,396 B1 * | 11/2003 | Hendriks et al. | | 382/154 |
| 6,801,641 B2 * | 10/2004 | Eraslan | | 382/118 |
| 6,862,374 B1 * | 3/2005 | Nagai et al. | | 382/285 |
| 6,879,323 B1 * | 4/2005 | Nagai et al. | | 345/420 |
| 6,975,756 B1 * | 12/2005 | Slabaugh et al. | | 382/154 |
| 7,212,664 B2 * | 5/2007 | Lee et al. | | 382/154 |
| 7,266,251 B2 * | 9/2007 | Rowe | | 382/285 |
| 7,426,292 B2 * | 9/2008 | Moghaddam et al. | | 382/154 |
| 7,860,340 B2 * | 12/2010 | Marugame et al. | | 382/274 |
| 8,064,685 B2 * | 11/2011 | Solem et al. | | 382/154 |
| 8,090,160 B2 * | 1/2012 | Kakadiaris et al. | | 382/118 |
| 8,090,194 B2 * | 1/2012 | Golrdon et al. | | 382/154 |
| 8,204,340 B2 * | 6/2012 | Kanazawa et al. | | 382/285 |
| 8,294,726 B2 * | 10/2012 | Burley et al. | | 345/582 |
| 8,320,648 B2 * | 11/2012 | Mailling et al. | | 382/128 |
| 2002/0054039 A1 * | 5/2002 | Lei et al. | | 345/419 |
| 2002/0164066 A1 * | 11/2002 | Matsumoto | | 382/154 |

(Continued)

*Primary Examiner* — Randolph I Chu
(74) *Attorney, Agent, or Firm* — Downs Rachlin Martin PLLC

(57) ABSTRACT

Creating a 3D face reconstruction model using a single 2D image and a generic facial depth map that provides depth information. In one example, the generic facial depth map is selected based on gender and ethnicity/race. In one embodiment, a set of facial features of the 2D image is mapped to create a facial-feature map, and a 2D mesh is created using the map. The same set of facial features is also mapped onto a generic facial depth map, and a 3D mesh is created therefrom. The 2D image is then warped by transposing depth information from the 3D mesh of the generic facial depth map onto the 2D mesh of the 2D image so as to create a reconstructed 3D model of the face. The reconstructed 3D model can be used, for example, to create one or more synthetic off-angle-pose images of the subject of the original 2D image.

22 Claims, 13 Drawing Sheets

(56) References Cited

U.S. PATENT DOCUMENTS

| | | | |
|---|---|---|---|
| 2003/0063778 A1* | 4/2003 | Rowe et al. | 382/115 |
| 2003/0099409 A1* | 5/2003 | Rowe | 382/285 |
| 2003/0113036 A1* | 6/2003 | Hwang | 382/285 |
| 2005/0063582 A1* | 3/2005 | Park et al. | 382/154 |
| 2006/0013505 A1* | 1/2006 | Yau et al. | 382/285 |
| 2006/0023923 A1* | 2/2006 | Geng et al. | 382/116 |
| 2007/0172126 A1* | 7/2007 | Kitamura | 382/190 |
| 2007/0258627 A1* | 11/2007 | Geng | 382/118 |
| 2008/0008399 A1* | 1/2008 | Marugame et al. | 382/285 |
| 2008/0310720 A1* | 12/2008 | Park et al. | 382/181 |
| 2009/0052748 A1* | 2/2009 | Jiang et al. | 382/118 |
| 2009/0103786 A1* | 4/2009 | Ives et al. | 382/118 |
| 2010/0134487 A1* | 6/2010 | Lai et al. | 345/419 |
| 2011/0211749 A1* | 9/2011 | Tan et al. | 382/154 |

* cited by examiner

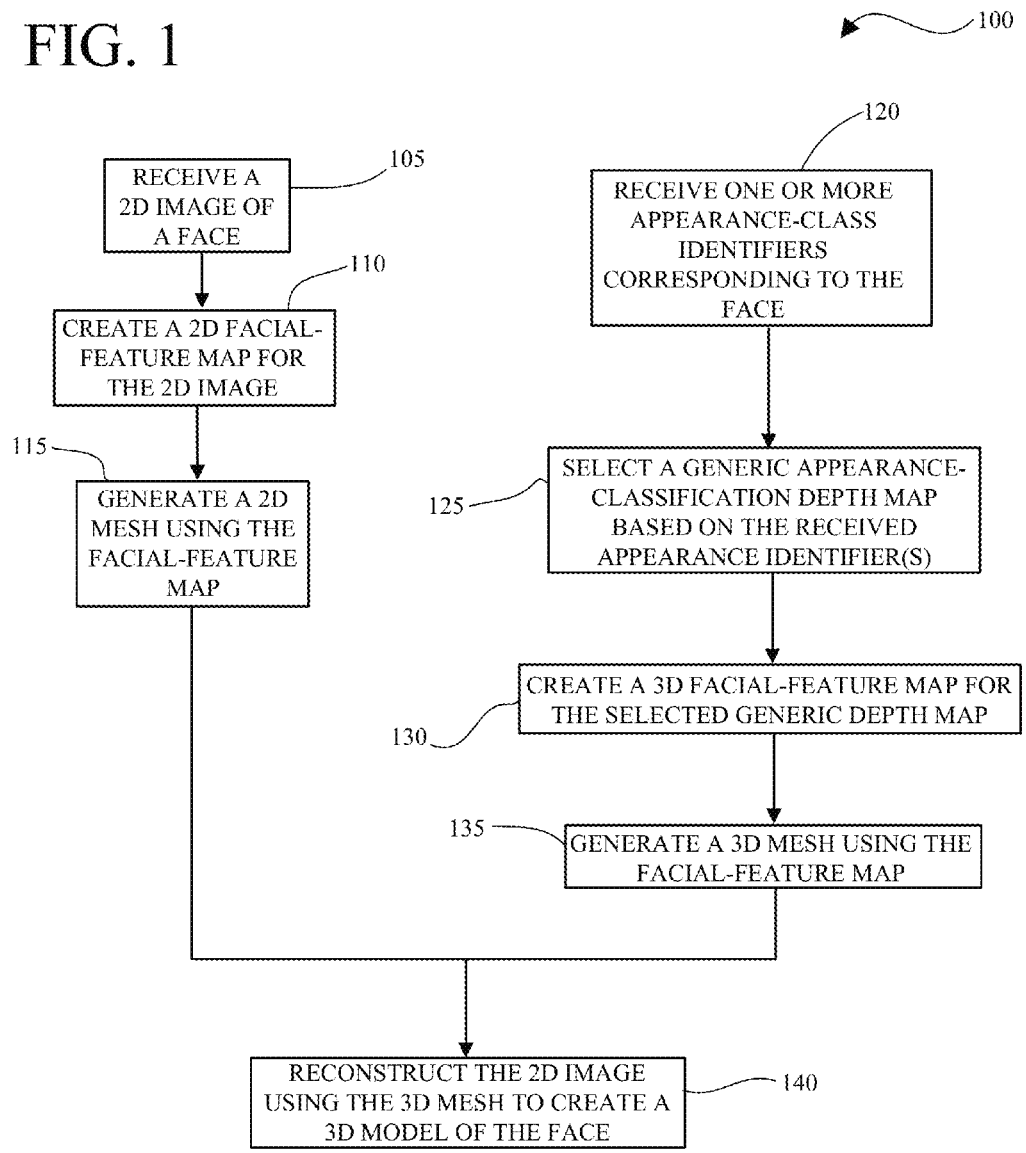

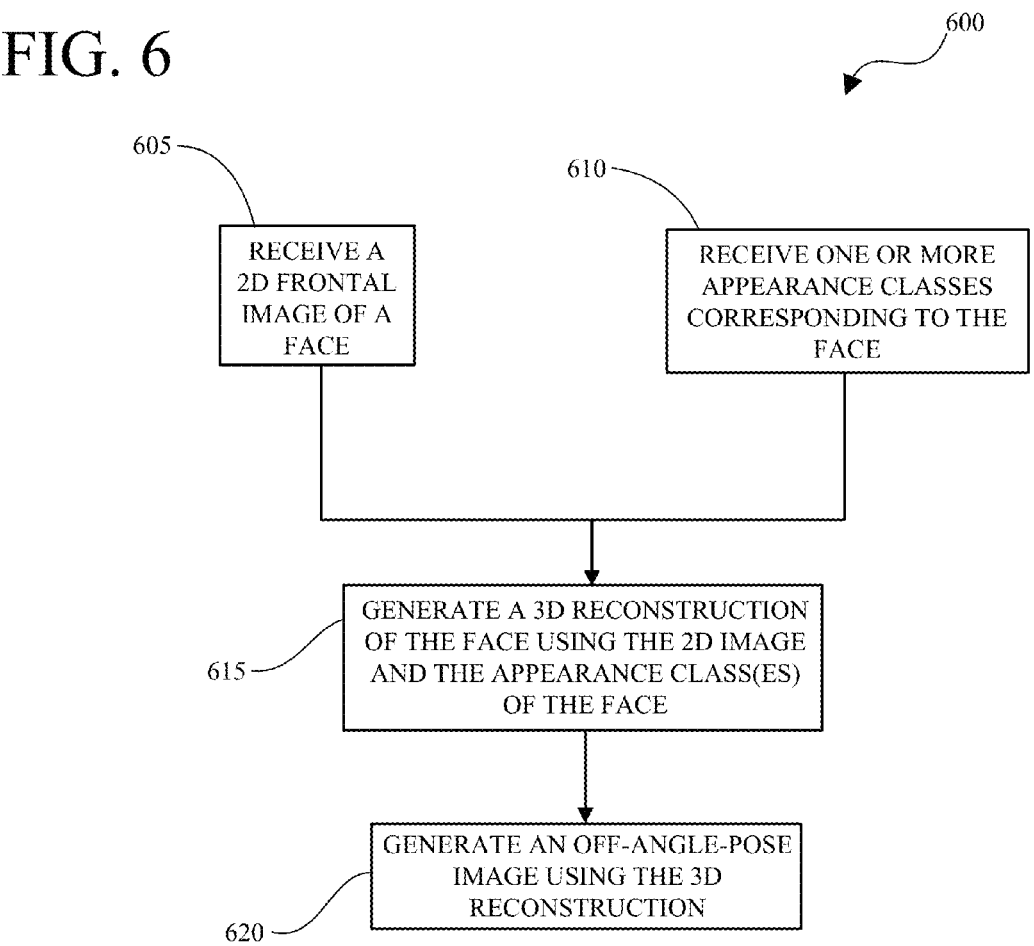

RAPID 3D FACE RECONSTRUCTION FROM A 2D IMAGE AND METHODS USING SUCH RAPID 3D FACE RECONSTRUCTION

RELATED APPLICATION DATA

This application claims the benefit of priority of U.S. Provisional Patent Application Ser. No. 61/399,881, filed on Jul. 19, 2010, and titled "Rapid 3D Face Reconstruction From A Single Image," which is incorporated by reference herein in its entirety.

FIELD OF THE INVENTION

The present invention generally relates to the field of facial modeling. In particular, the present invention is directed to rapid 3D face reconstruction from a 2D image and methods using such rapid 3D face reconstruction.

BACKGROUND

Modeling three-dimensional (3D) faces for the purpose of synthesizing novel face images from a single two-dimensional (2D) image is one of the most difficult and challenging tasks in computer vision, partly because of large variations in human faces. Researchers have been developing technologies for 3D face modeling without relying on 3D sensors due to the demands in many real-world operating scenarios that require efficient, uncooperative, and cost-effective solutions. Research topics in this field include shape-from-shading, shape-from-stereo, structure-from-motion, and shape-from-texture. However, the quality of 3D face models obtained from these methods is often not satisfactory, and, more importantly, many of these approaches require multiple images. Thus reconstructing a 3D face from a single 2D face image is extremely challenging.

To achieve realistic 3D face modeling, it becomes necessary to use prior knowledge of a statistical 3D face model. However, these methods are known to be computationally expensive and may require manually annotated control points or camera calibration. More efficient 3D face modeling approaches are desired in numerous applications, which demand real-time computation and less user cooperation. Applications include automated face recognition in surveillance video, access control, entertainment, and online 3D gaming, among others.

SUMMARY OF THE DISCLOSURE

In one implementation, the present disclosure is directed to a method of automatedly generating a 3D reconstruction of a face having an appearance classification using a machine. The method includes receiving a 2D image of the face; receiving the appearance classification of the face; selecting a generic appearance-classification depth map corresponding to the received appearance classification; and morphing the 2D image as a function of the generic appearance-classification depth map so as to generate the 3D reconstruction of the face.

In another implementation, the present disclosure is directed to a method of automatedly generating an off-angle 2D image of a face having an appearance classification using a machine. The method includes receiving a head-on 2D image of the face; receiving the appearance classification of the face; selecting a generic appearance-classification depth map corresponding to the received appearance classification; morphing the 2D image as a function of the generic appearance-classification depth map so as to generate a 3D reconstruction of the face; and creating the off-angle 2D image as a function of the 3D reconstruction.

In still another implementation, the present disclosure is directed to a method of identifying, using a machine, a subject in an off-angle 2D image that includes the subject's face and is taken at an off-angle, wherein the subject's face has an appearance classification. The method includes receiving the off-angle 2D image containing the subject to be identified receiving a head-on 2D image containing a face of a potential match to the subject; receiving the appearance classification of the subject's face; selecting a generic appearance-classification depth map corresponding to the received appearance classification; morphing the head-on 2D image as a function of the generic appearance-classification depth map so as to generate a 3D reconstruction of the face of the potential match; creating an off-angle 2D image of the face of the potential match as a function of the 3D reconstruction so that the off-angle 2D image of the face of the potential match is at or near the off-angle of the 2D off-angle image containing the face of the subject to be identified; and comparing the off-angle 2D image containing the face of the subject to be identified and the off-angle 2D image of the face of the potential match with one another to determine whether or not a match exists.

In yet another implementation, the present disclosure is directed to a machine-readable storage medium containing machine-executable instructions for performing a method of automatedly generating a 3D reconstruction of a face having an appearance classification using a machine. The machine executable instructions include a first set of machine-executable instructions for receiving a 2D image of the face; a second set of machine-executable instructions for receiving the appearance classification of the face; a third set of machine-executable instructions for selecting a generic appearance-classification depth map corresponding to the received appearance classification; and a fourth set of machine-executable instructions for morphing the 2D image as a function of the generic appearance-classification depth map so as to generate the 3D reconstruction of the face.

In still yet another implementation, the present disclosure is directed to a machine-readable storage medium containing machine-executable instructions for performing a method of automatedly generating an off-angle 2D image of a face having an appearance classification using a machine. The machine-executable instructions include a first set of machine-executable instructions for receiving a head-on 2D image of the face; a second set of machine-executable instructions for receiving the appearance classification of the face; a third set of machine-executable instructions for selecting a generic appearance-classification depth map corresponding to the received appearance classification; a fourth set of machine-executable instructions for morphing the 2D image as a function of the generic appearance-classification depth map so as to generate a 3D reconstruction of the face; and a fifth set of machine-executable instructions for creating the off-angle 2D image as a function of the 3D reconstruction.

In a further implementation, the present disclosure is directed to a machine-readable storage medium containing machine-executable instructions for performing a method of identifying, using a machine, a subject in an off-angle 2D image that includes the subject's face and is taken at an off-angle, wherein the subject's face has an appearance classification. The machine-executable instructions include a first set of machine-executable instructions for receiving the off-angle 2D image containing the subject to be identified a second set of machine-executable instructions for receiving a head-on 2D image containing a face of a potential match to the subject; a third set of machine-executable instructions for receiving the appearance classification of the subject's face; a fourth set of machine-executable instructions for selecting a generic appearance-classification depth map corresponding to the received appearance classification; a fifth set of machine-executable instructions for morphing the head-on 2D image as a function of the generic appearance-classification depth map so as to generate a 3D reconstruction of the face of the potential match; a sixth set of machine-executable instructions for creating an off-angle 2D image of the face of the potential match as a function of the 3D reconstruction so that the off-angle 2D image of the face of the potential match is at or near the off-angle of the 2D off-angle image containing the face of the subject to be identified; and a seventh set of machine-executable instructions for comparing the off-angle 2D image containing the face of the subject to be identified and the off-angle 2D image of the face of the potential match with one another to determine whether or not a match exists.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 1 is a flow diagram illustrating a method of a reconstructing a three-dimensional (3D) model of a face from a two-dimensional (2D) image of that face;

FIG. 6 illustrates a method of generating a synthetic 2D off-angle-pose image from a 2D frontal face image;

DETAILED DESCRIPTION

The present disclosure is directed to apparatus, systems, methods, and software that include features, steps, and/or machine-readable instructions for reconstructing a two-dimensional (2D) image of a face into a three-dimensional (3D) model of that face using appearance classification information, such as gender and ethnicity/race information, relating to the subject face. As will be appreciated by those skilled in the art, the methodologies disclosed herein can be used to create a highly accurate 3D model very rapidly from a single 2D image. 3D models created using methodologies of the present disclosure are useful in a wide variety of applications, including generating one or more synthetic 2D images of a subject face as viewed from the vantage point of the original 2D image (referred to herein as "off-angle images") and face recognition/matching using a captured off-angle image, among others. Exemplary embodiments of rapid 3D model reconstruction, synthetic off-angle image generation, and face recognition/matching are described below in detail.

An important discovery made by the present inventors is that depth information of a face is not significantly discriminative among members of the same appearance class(es), such as gender and ethnicity/race classes. This discovery serves to emphasize the unimportance of exact depth estimation of each face for 2D face synthesis and face recognition. It is shown below that depth information can be synthesized using a generic depth information. This way, 3D face shapes can be represented very efficiently without the need to acquire depth information for each individual.

Figure 2A:
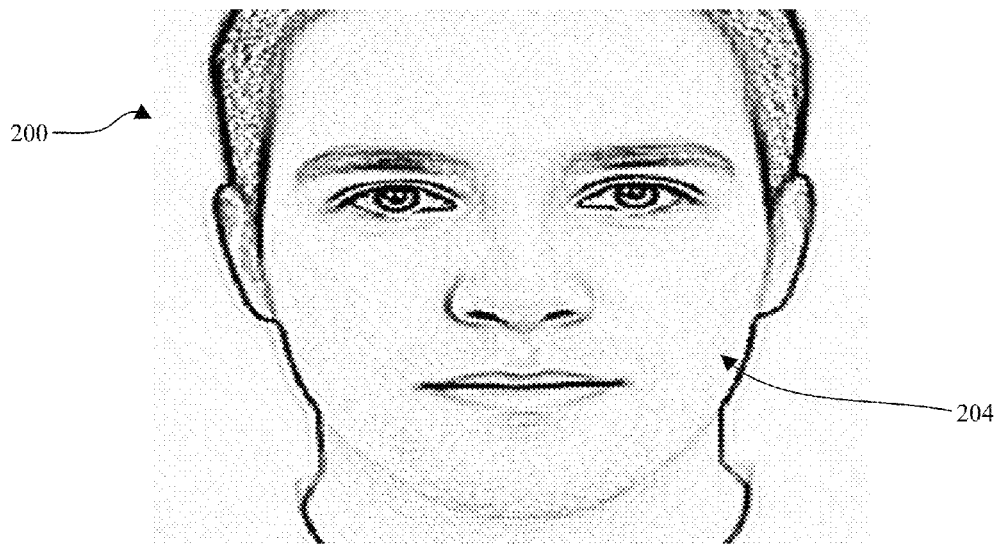
FIG. 2A is a diagram illustrating a 2D image of an exemplary face.
Figure 3:
FIG. 3 is a diagram illustrating a 3D model of the face as reconstructed from the 2D image of FIG. 2A
Figure 15:
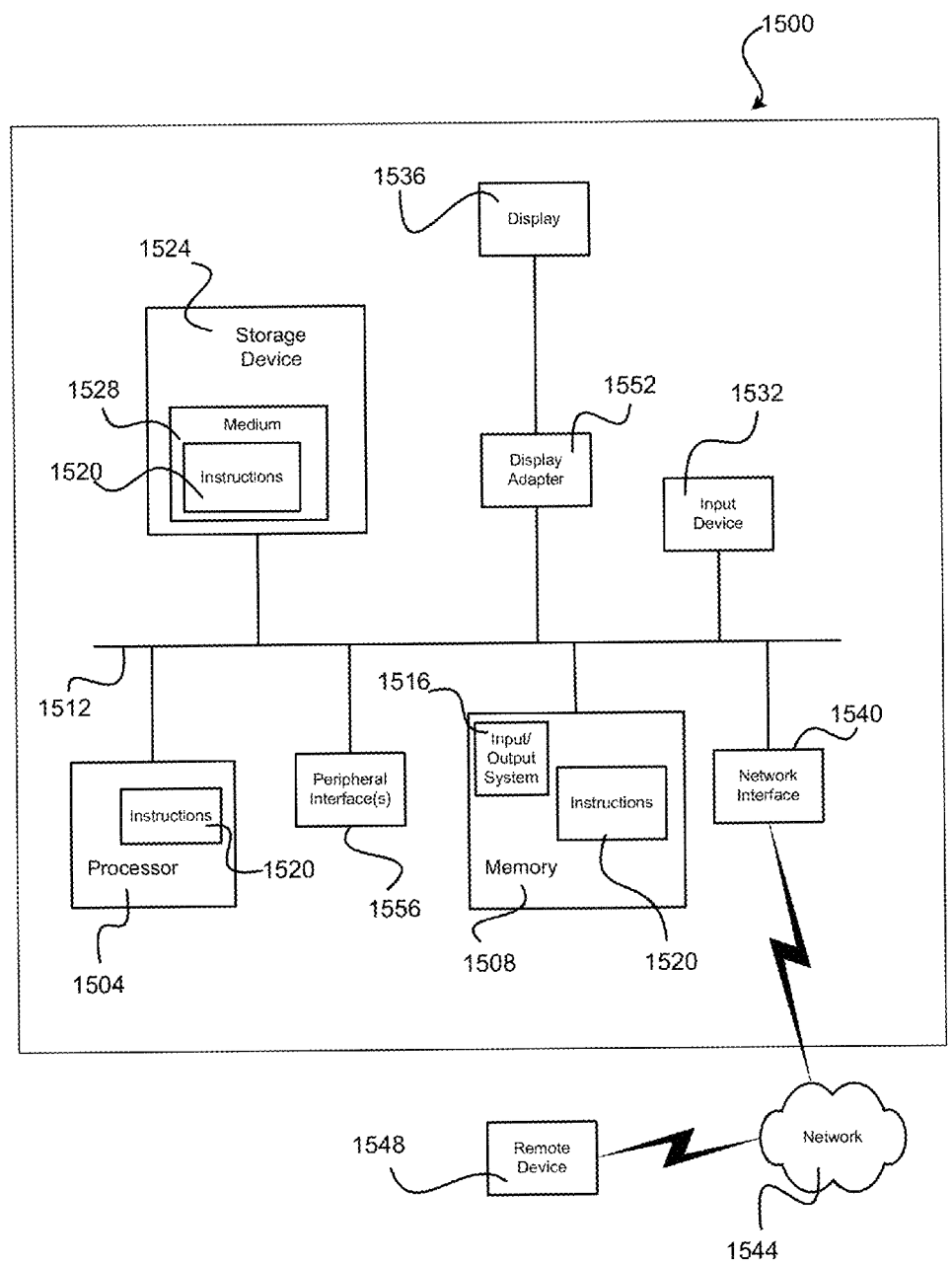
FIG. 15 is a diagram illustrating a machine that can implement methods of the present disclosure and/or various portions of such methods.

Referring now to the drawings, FIG. 1 illustrates an exemplary method 100 of reconstructing a 3D model of a face from a 2D image of that face. For the sake of illustration, FIG. 2A illustrates a 2D image 200 of a face 204, and FIG. 3 illustrates a 3D model 300 reconstructed from 2D image 200 using method 100. Returning to FIG. 1, in this example method 100 begins at step 105 with the receipt of a 2D image, such as 2D image 200 of FIG. 2A, of a face to be reconstructed, into a 3D model, such as 3D model 300 of FIG. 3. As those skilled in the art will readily appreciate, the 2D image can be any image of any human face, and will typically be a frontal view of the subject face. Frontal views typically work best, since most human faces are not perfectly symmetrical, and frontal views allow any asymmetrical features to be included in the reconstruction methodology of method 100. However, an off-angle 2D image can be used if needed, but may result in somewhat compromised results. Those skilled in the art will readily appreciate that the 2D image will typically be utilized by method 100 in the form of a digital image contained in a suitable image file, such as a JPG file, a GIF file, a PNG file, a TIF, or a RAW file, among others. Consequently, the term "image" and like terms as used herein refer not only to a print image, an electronically rendered image, etc., but also to the image-defining content of 1) a digital image file, 2) a signal, 3) a digital memory, or 4) other medium containing that information. Typically, at step 105 the 2D image is received by a machine, such as a digital computer, system of computers, etc., containing software or including other means for performing various steps of method 100. FIG. 15 illustrates an exemplary computer system 1500 that can be used to implement various steps of method 100 or any other method incorporating features/functionality disclosed herein.

Figure 2B:
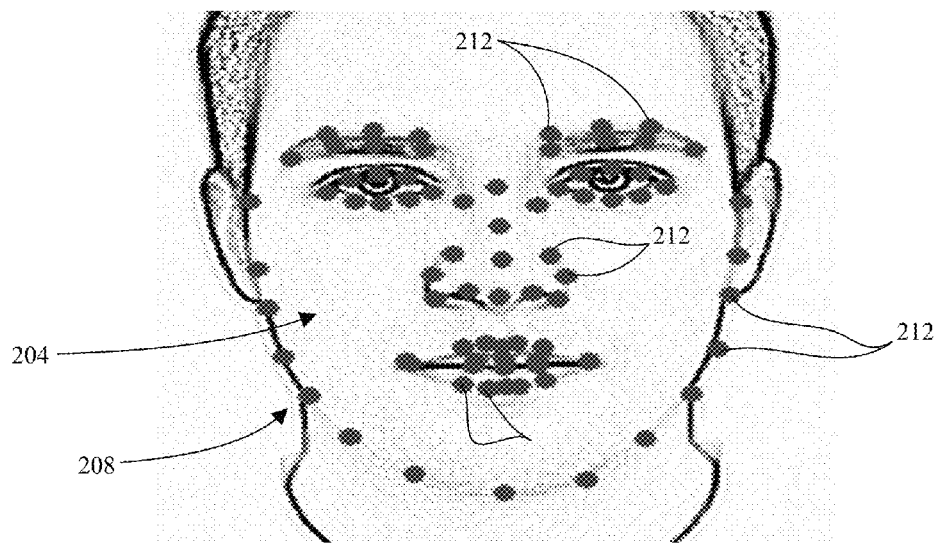
FIG. 2B is a diagram showing, as an overlay, a 2D facial-feature map for the 2D image of FIG. 2A.

At step 110, a 2D facial-feature map is created for the 2D image received at step 105. FIG. 2B illustrates an exemplary facial-feature map 208 for face 204 of FIG. 2A. The facial-feature map is a 2D map because it is composed of landmark points on the 2D image. The facial-feature map created at step 110 can include as many landmark points as desired for a particular application. Facial features that can be mapped at step 110 include eyes, eyelids, nose, mouth, ears, cheeks, eyebrows, chin, lips, etc., as well as transitions between the various features. Exemplary facial-feature map 208 of FIG. 2B includes 74 landmark points 212 (only a few are labeled for convenience). In other embodiments, more or fewer than 74 landmark points can be mapped to create a 2D facial feature map. Step 110 can be performed in any suitable manner, such as automatedly using digital feature-identification techniques or, for example, using semi-automated techniques in which a person identifies the desired landmark points. Regarding the latter, the person could use a digitizer, touch screen, scanner, or other input device to input the landmark points into a machine that creates the 2D facial-feature map. Like step 105, step 110 can be implemented using a suitable machine, such as computer system 1500 of FIG. 15.

Figure 2C:
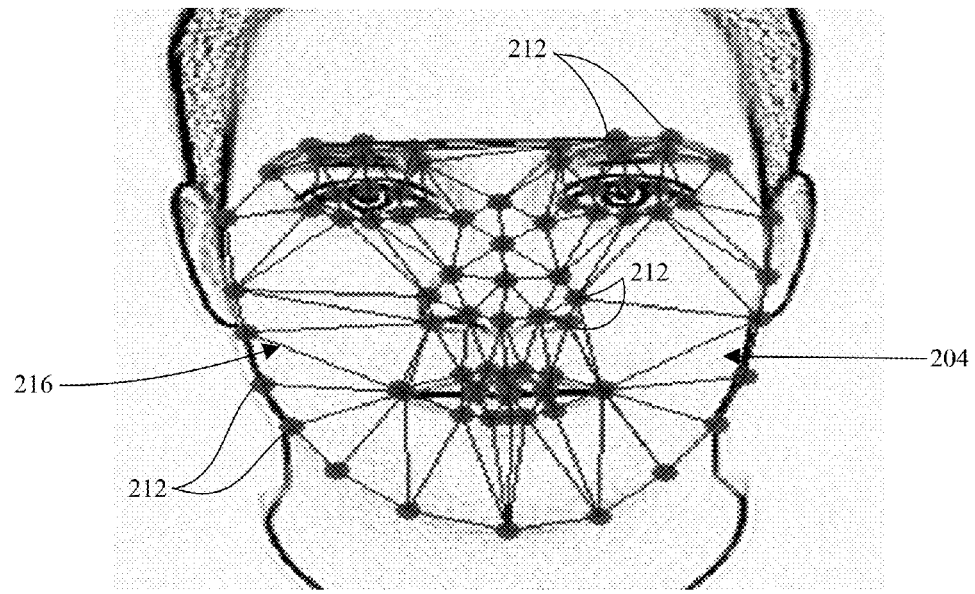
FIG. 2C is a diagram showing, as an overlay, a coarse 2D mesh formed using the 2D facial-feature map of FIG. 2B.
Figure 2D:
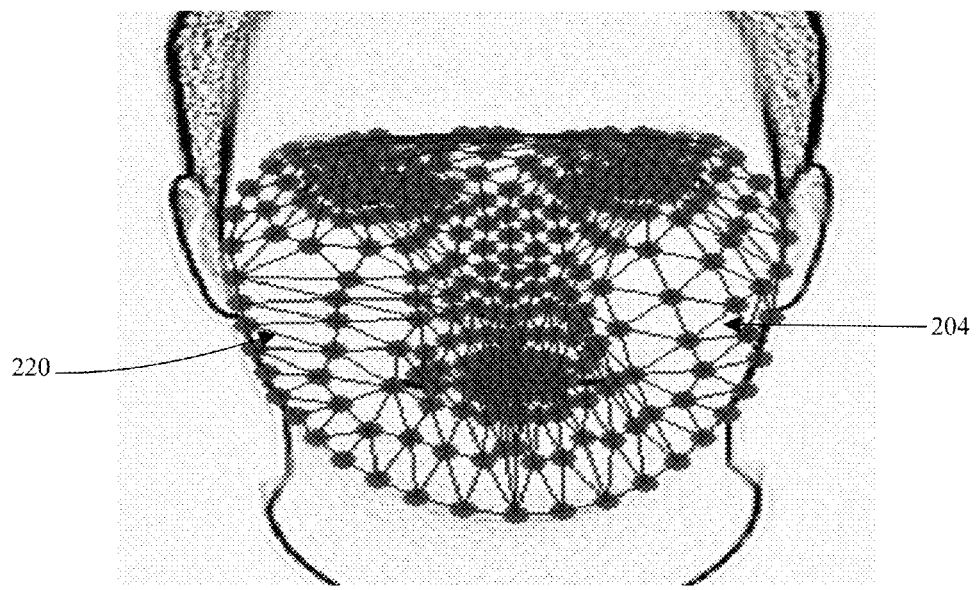
FIG. 2D is a diagram showing, as an overlay, a fine 2D mesh formed using the coarse 2D mesh of FIG. 2C.

At step 115, a 2D mesh is formed using the landmark points of the 2D facial-feature map created at step 110. The 2D mesh includes lines connecting various ones of the landmark points together so as to form a plurality of polygons, such as triangles, and can further include polygons created by subdividing the mesh one or more times. FIG. 2C illustrates a coarse 2D mesh 216 for face 204 that was created by connecting various ones of landmark points 212 together. FIG. 2D illustrates a fine 2D mesh 220 for face 204 that was created by subdividing coarse 2D mesh 216 multiple times. As an example, known loop subdivision techniques can be used for the subdivision. Of course, coarse and fine 2D meshes 216 and 220 of FIGS. 2C and 2D, respectively, are merely illustrative. Actual meshes used in real-world implementations may be different depending, for example, on the number and locations of the landmark points, the manner in which the landmark points are connected together, the number of subdivisions utilized, and the manner in which subdivision is performed, among others. Those skilled in the art will readily appreciate that the formation of the 2D mesh, including the connecting of landmark points with one another to form a coarse mesh and the subdividing of the coarse mesh, can be performed in any suitable manner, such as automatedly by a machine, such as computer system 1500 of FIG. 15, or semi-automatedly using various manual inputs by a person. Those skilled in the art will understand how to implement both automated and semi-automated 2D mesh generation techniques.

At step 120, one or more appearance-class identifiers are received. Each of these identifiers denotes one or more appearance classes to which the face in the 2D image received at step 105 belongs. As used herein and in the appended claims, an "appearance class" is a class in which, on average, its members share one or more facial distinctions or traits that are characteristic of that class. Examples of appearance class categories include gender, ethnicity/race, genetic anomaly (e.g., Down's syndrome), etc. An appearance-class identifier is any identifier that identifies to the machine or other means the appearance class(es) at issue. As will be seen below, the appearance class(es) identified by the appearance-class identifier(s) is/are used at step 130. In an embodiment wherein an appearance class is gender, exemplary appearance-class identifiers are "male", "female", "M", "F", but could be any other suitable identifier, including numerals. In an embodiment wherein an appearance class is ethnicity/race, exemplary appearance-class identifiers are "Asian", "Caucasian," "Hispanic," "Black," and any or all of the hundreds of ethnic group names, abbreviations thereof, and codes therefor. As will be appreciated from the following discussion, the finer the gradation of the appearance classifications, the better the reconstructed 3D model will be.

At step 125, a generic appearance-classification (AC) depth map is selected based on the identifier(s) received at step 120. A generic AC depth map is essentially a 3D contour map of the facial features of a generic face having the characteristic features of the appearance class(es) identified by the appearance-class identifier(s) received at step 120. For example, in a simple scenario where both gender and ethnicity/race are the utilized appearance-class categories and the gender classes are male and female and the ethnicity/race classes are Asian and Caucasian, step 125 would involve a selection from among four generic AC depth maps, specifically, a generic Asian-male depth map, a generic Asian-female depth map, a generic Caucasian-male depth map, and a generic Caucasian-female depth map. Assuming that the face in the 2D image received at step 105 is one of male and female and one of Asian and Caucasian, and then step 125 involves selecting the corresponding generic AC depth map. For example, if the face in the received 2D image is a female Asian face, then step 125 would involve selecting the generic female-Asian depth map.

Figure 4:
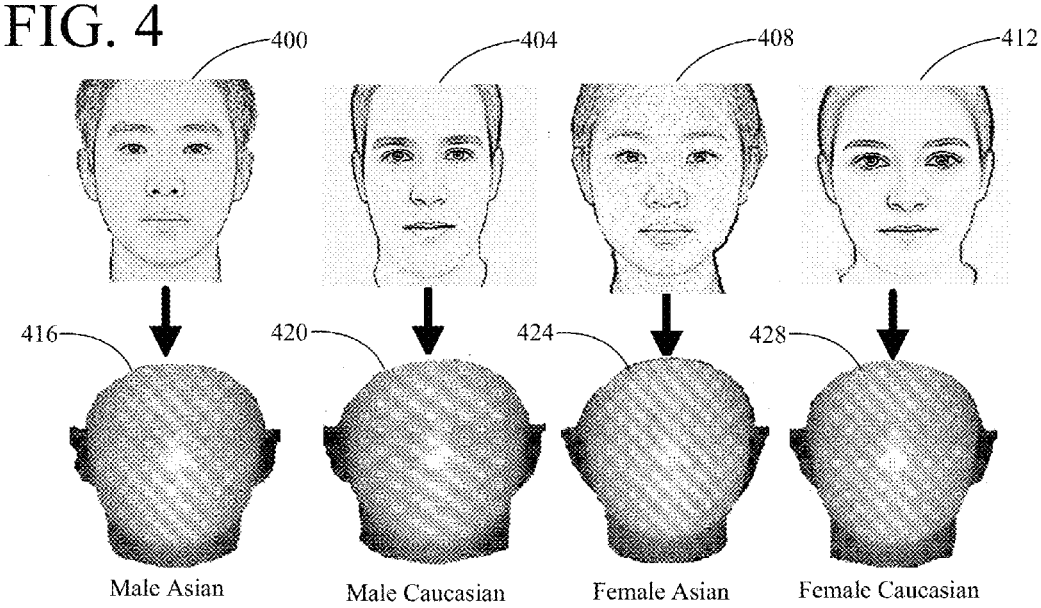
FIG. 4 is a diagram illustrating the generating of generic appearance-classification (AC) depth maps from generic 3D AC models for males and females of Asian and Caucasian ethnicity.
Figure 5A:
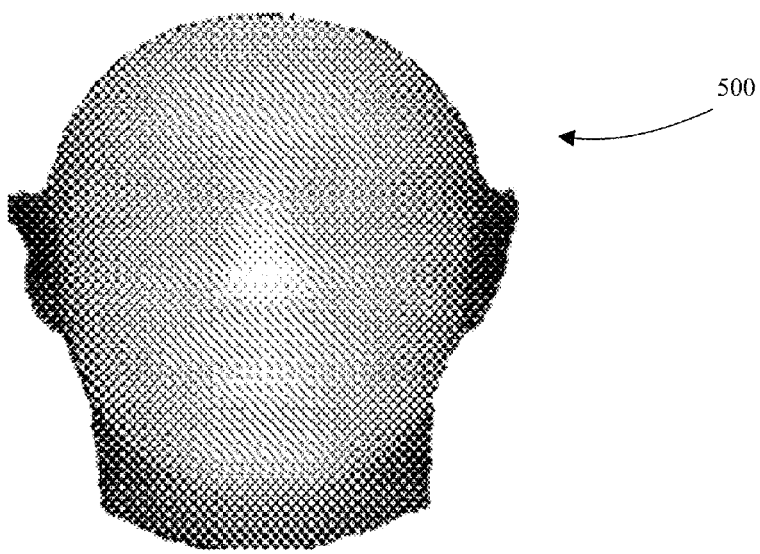
FIG. 5A is a diagram illustrating a generic AC depth map.

FIG. 4 illustrates this simple scenario. The upper row of FIG. 4 contains four generic AC 3D models 400, 404, 408, 412 used to create the corresponding respective generic AC depth maps 416, 420, 424, 428. In this example, generic AC 3D models 400, 404, 408, 412 are statistical composites of average features for the corresponding gender-ethnicity/race combination. Specifically, generic AC 3D model 400 is for a male Asian, model 404 is for a male Caucasian, model 408 is for a female Asian, and model 412 is for a female Caucasian. Correspondingly, generic AC depth map 416 is for a male Asian, depth map 420 is for a male Caucasian, depth map 424 is for a female Asian, and depth map 428 is for a female Caucasian. In this example, generic AC depth maps 416, 420, 424, 428 are intensity-based maps in which the darker the pixel, the deeper the corresponding location on the respective 3D model 400, 404, 408, 412. Those skilled in the art will appreciate that depth maps of types other than intensity type can be used if desired. For the sake of illustration, FIG. 5A contains a selected generic AC depth map 500 of the intensity type.

Figure 5B:
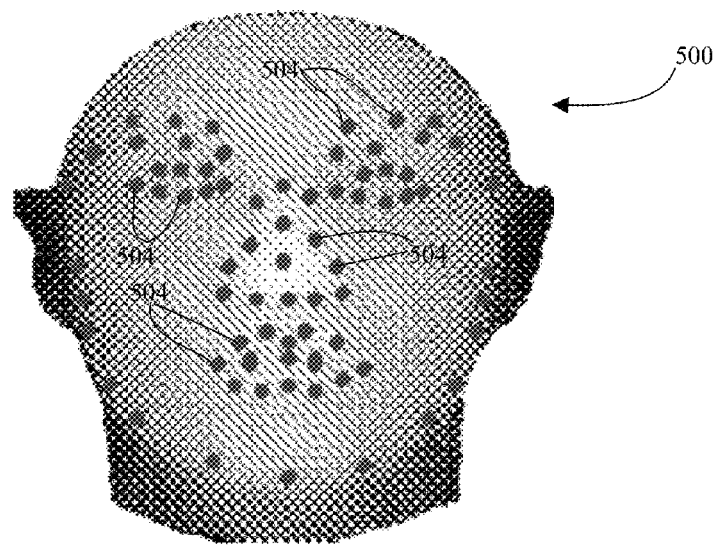
FIG. 5B is a diagram showing, as an overlay, a 3D facial-feature map for the generic AC depth map of FIG. 5A.

Once a generic AC depth map has been selected at step 125, at step 130 a 3D facial-feature map is created for the selected generic AC depth map. The creation of the 3D facial-feature map involves utilizing the same set of landmarks used for the 2D facial feature map of step 110 so that there is a one-to-one correspondence of landmark points as between the 2D and 3D maps to facilitate morphing of the original 2D image at step 140, discussed below. FIG. 5B illustrates the locations of exemplary landmark points 504 for generic AC depth map 500 that have one-to-one correspondence with landmark points 212 of FIG. 2B.

At step 135, a 3D mesh is formed using the landmark points of the 3D facial-feature map created at step 130. The 3D mesh includes lines connecting the various ones of the landmark points together so as to form a plurality of polygons, such as triangles, and can further include polygons created by subdividing the mesh one or more times. The locations of the connecting lines and subdivision points should correspond to the connecting lines and subdivision points on the corresponding 2D mesh created at step 115.

Figure 5C:
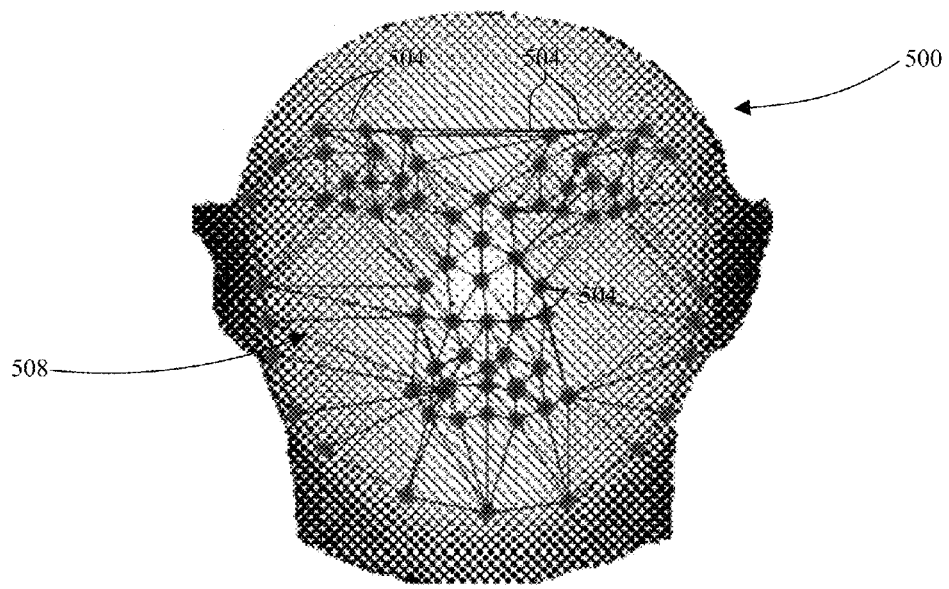
FIG. 5C is a diagram showing, as an overlay, a coarse 3D mesh formed using the 3D facial-feature map of FIG. 5B.
Figure 5D:
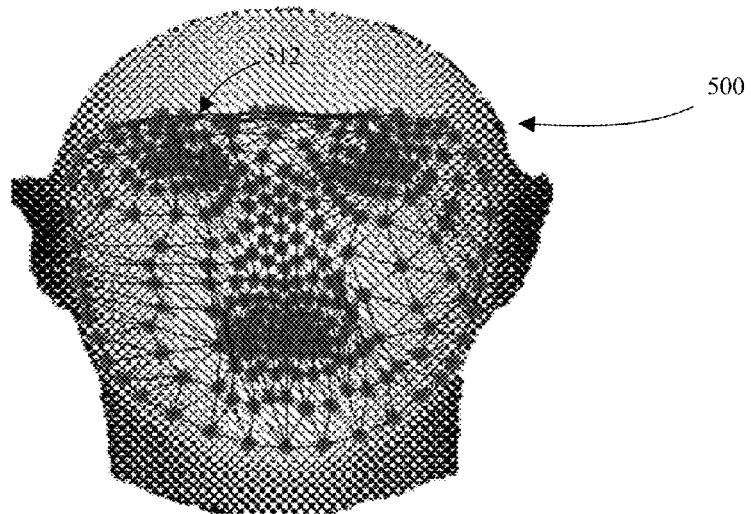
FIG. 5D is a diagram showing, as an overlay, a fine 3D mesh formed using the coarse 3D mesh of FIG. 5C.

FIG. 5C illustrates a coarse 3D mesh 508 for generic AC depth map 500 that was created by connecting various ones of landmark points 504 together in a manner that mimics coarse 2D mesh 216 of FIG. 2C but included depth information. FIG. 5D illustrates a fine 3D mesh 512 for generic AC depth map 500 that was created by subdividing coarse 3D mesh 508 multiple times using the same number of subdivisions as used for fine 2D mesh 220 of FIG. 2D. Of course, coarse and fine 2D meshes 216 and 220 of FIGS. 2C and 2D and corresponding respective coarse and fine 3D meshes 508, 512 are merely illustrative. Actual meshes used in real-world implementations may be different depending, for example, on the number and locations of the landmark points, the manner in which the landmark points are connected together, the number of subdivisions utilized, and the manner in which subdivision is performed, among others. Those skilled in the art will readily appreciate that the formation of the 3D mesh, including the connecting of landmark points with one another to form a coarse mesh and the subdividing of the coarse mesh, can be performed in any suitable manner, such as automatedly by a machine, such as computer system 1500 of FIG. 15, or semi-automatedly using various manual inputs from a person. Those skilled in the art will understand how to implement both automated and semi-automated 3D mesh generation techniques.

At step 140, the original 2D image received at step 105 is reconstructed using the contour information contained in the generic AC depth model. In the present example, this is done by morphing the original 2D image by transposing, for example, by warping, the depth information in the 3D mesh created at step 135 to the 2D mesh created at step 115 so as to essentially deform the 2D mesh into a 3D transposed mesh, and then mapping points, or pixels, from the original 2D image to the 3D transposed mesh to create the 3D model. In other words, the original 2D image is morphed using the depth information from the 3D mesh. It is noted that this mapping of the original 2D image to the 3D transposed mesh preserves the texture of the input 2D image and maintain any forensic features, such as scars, marks or moles. This is not readily achievable using conventional subspace methods, such as principal component analysis.

An exemplary warping technique that can be used to transpose the 2D mesh with the 3D mesh depth information is a piecewise affine transform. In one example, the reconstruction of the 3D image is represented by:

$$S_r = (x, y, z = D(M(\tilde{x}, \tilde{y})))$$

$$T_r = I(P(x,y,z)) = (R_{x,y,z}, G_{x,y,z}, B_{x,y,z}) \quad \{1\}$$

wherein,
P is the original 2D image;
$S_r$ is shape;
x, y, and z are Cartesian coordinates;
D is the generic AC depth map;
M is the 3D mesh of the depth map;
$T_r$ is texture;
$\tilde{x}$ and $\tilde{y}$ in M are the registered points x and y in image P;
I is intensity of points in image P; and
$R_{x,y,z}$, $G_{x,y,z}$, and $B_{x,y,z}$ are the red, green, blue values of corresponding points x,y,z.

Figure 7:
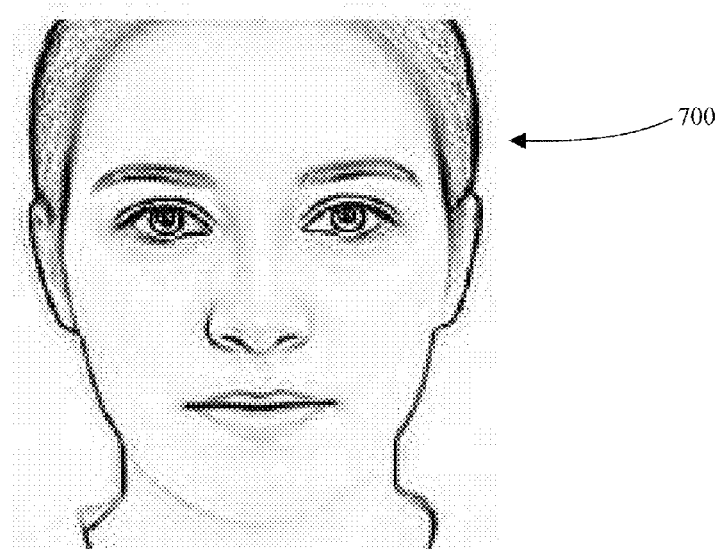
FIG. 7 is a 2D frontal face image.

FIG. 6 illustrates an exemplary method 600 of generating a synthetic 2D off-angle-pose of a face starting with a 2D frontal image of the face. In this context, "synthetic" means that the image is created from a model, rather than created from an actual subject. As described below, such a method can be used, for example, in identifying the subject of a 2D off-angle-pose captured image. However, before describing an example of how that identification can be done, method 600 is first described. Referring to FIG. 6, at step 605 a 2D frontal image of a subject's face is received. As with various steps of method 100 of FIG. 1, this and other steps of method 600 are couched in terms of the steps being performed by a machine, such as computer system 1500, that is configured to perform/execute that step. For the sake of illustration, FIG. 7 illustrates a 2D frontal face image 700 that can be used by method 600 of FIG. 6. As those skilled in the art will readily appreciate, 2D frontal face image 700 can be an image of any human face. Those skilled in the art will readily appreciate that 2D frontal face image 700 (FIG. 7) will typically be utilized by method 600 (FIG. 6) in the form of a digital image contained in a suitable image file, such as a JPG file, a GIF file, a PNG file, a TIF, or a RAW file, among others. Consequently, the term "image" and like terms as used herein refer not only to a print image, an electronically rendered image, etc., but also to the image-defining content of a digital image file, a signal, a digital memory, or other medium containing that information.

At step 610, one or more appearance-classes are received, for example, using one or more appearance class identifiers. Each identifier denotes one or more appearance classes to which the face in the 2D frontal face image received at step 605 belongs. Again, an "appearance class" is a class in which, on average, the class members share one or more facial distinctions or traits that are characteristic of that class, and examples of appearance classes and corresponding identifiers are provided above relative to method 100 of FIG. 1. The reader is referred to that section of the disclosure for a detailed description of appearance class and exemplary identifiers that can be implemented at step 610. In one example, the appearance classes utilized are gender and ethnicity/race.

Figure 8:
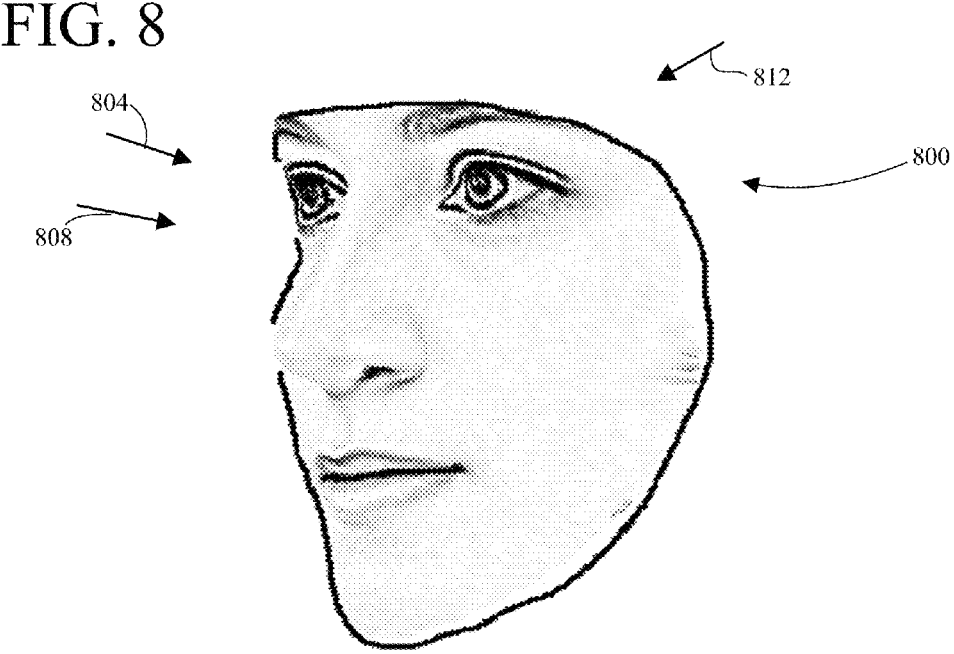
FIG. 8 is a 3D model reconstructed from the 2D image of FIG. 7.

At step 615, a 3D reconstruction of the 2D frontal face image received is generated using the 2D frontal face image and the corresponding appearance class(es) received at step 610. Step 615 can be carried out, for example, using steps 110, 115, and 125 to 140 of FIG. 1. As a brief overview of those steps, a 2D mesh is created using facial features contained in the 2D frontal face image, a corresponding 3D mesh is created using a generic AC depth map, and the 2D frontal face image is morphed by transposing the 3D mesh onto the original 2D mesh. FIG. 8 illustrates a 3D reconstructed face model 800 corresponding to input 2D frontal face image 700 of FIG. 7.

After creating the 3D model at step 615, at step 620 one or more synthetic off-angle-pose images are created using the 3D model. As those skilled in the art will readily appreciate, the 3D model created at step 615 is a virtual model that can be manipulated, for example, rotated and/or translated, in any direction to achieve any desired off-angle pose. Alternatively, the 3D model can remain fixed and the vantage point can be moved as desired to create the off-angle view. Once the 3D model is at the desired orientation or the vantage point has been moved to the desired position and orientation, a corresponding synthetic off-angle-pose image can be created. The off-angle-pose image can be either 3D or 2D as desired. As described below, synthetic 2D off-angle-pose images created in this manner can have a particular usefulness in subject identification in which the captured images of a subject and potential matches to that subject are 2D images. That said, 3D off-angle-pose images can be useful, too.

Figure 9A:
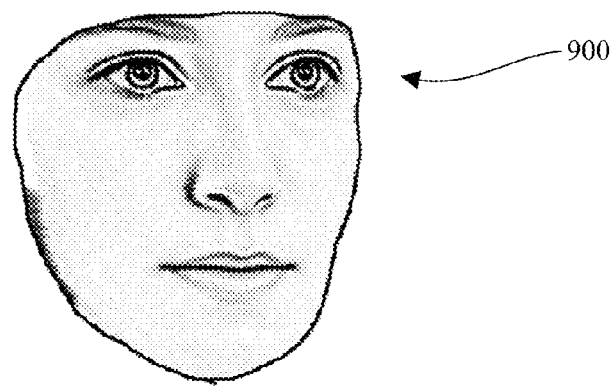
FIGS. 9A-9C are exemplary synthetic off-angle-pose images created from the 3D image of FIG. 8.
Figure 9B:
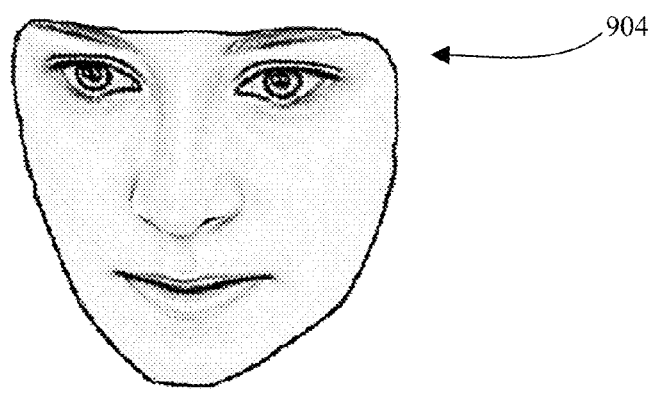
Figure 9C:
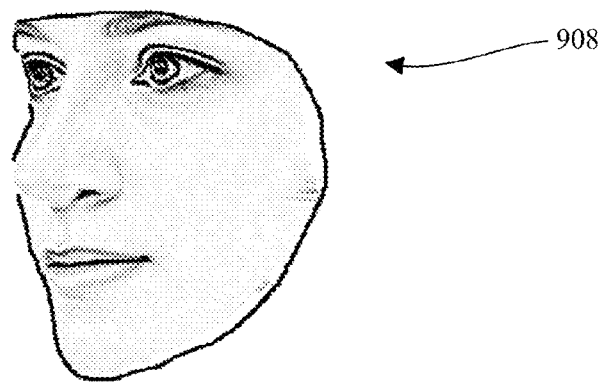

FIGS. 9A to 9C illustrate three synthetic 2D off-angle-pose images 900, 904, 908 created from 3D model 800 of FIG. 8. Specifically, synthetic off-angle-pose image 900 of FIG. 9A is a 2D image that is an image as it would appear if captured by a virtual camera (represented by arrow 804) at the position and orientation shown in FIG. 8. Similarly, synthetic off-angle-pose image 904 of FIG. 9B is a 2D image that is an image as it would appear if captured by a virtual camera (represented by arrow 808) at the position and orientation shown in FIG. 8. Likewise, synthetic off-angle-pose image 908 of FIG. 9C is a 2D image that is an image as it would appear if captured by a virtual camera (represented by arrow 812) at the position and orientation shown in FIG. 8. Those skilled in the art will be familiar with, and understand how to, generate off-angle-pose images at step 620 using known techniques for creating such images using 3D models.

Figure 10:
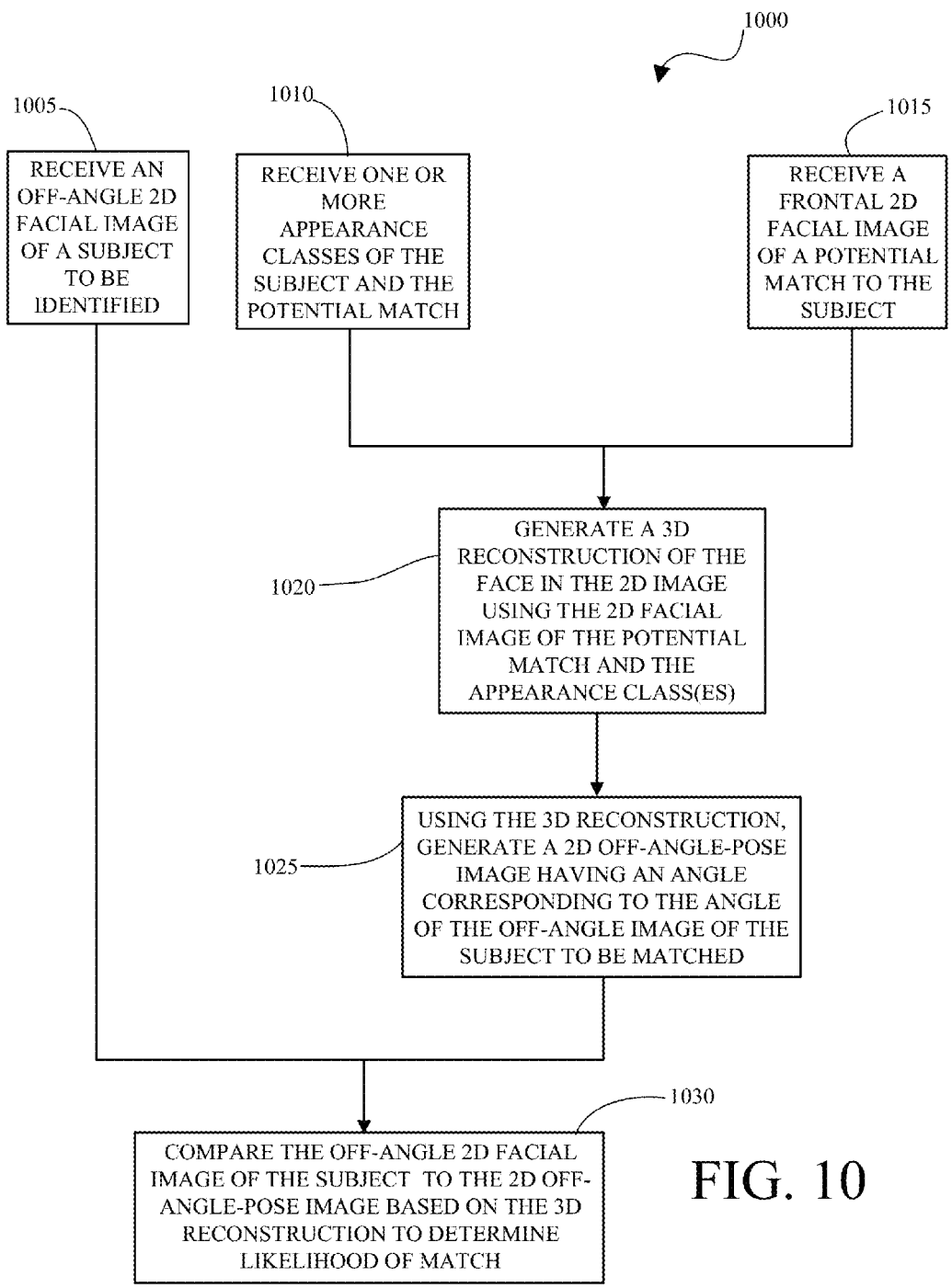
FIG. 10 illustrates a method of identifying the subject of a 2D off-angle-pose image.

FIG. 10 illustrates an exemplary method 1000 of identifying the subject of a 2D image that contains the subject's face in an off-angle pose. For the sake of illustration and sample context, in one example the subject is the perpetrator of a crime and the 2D image of the subject was captured by a surveillance camera, which could be either a still camera, video camera, or other image-capturing device. If a video camera, the image could be a single frame of the captured video. This example is particularly salient to method 1000, since surveillance cameras are typically mounted in positions and orientations wherein captured images of people are usually off-angle-pose images. In addition, in such a criminal-identification scenario available images of potential suspects are typically 2D "mug shots," which usually include full frontal face images and sometimes profile images. Since the captured off-angle-pose image of a perpetrator is rarely either of these views, it can be difficult to perform a satisfactory automated image matching process because of the differences in the view angle of the images to be compared. To overcome these challenges in this scenario, method 1000 creates a synthesized off-angle-pose image from a 2D frontal face image for each potential suspect that is at a view angle that matches or nearly matches the view angle of the captured 2D image of the perpetrator so that the image-matching algorithm utilized has comparable images to process.

Figure 11:
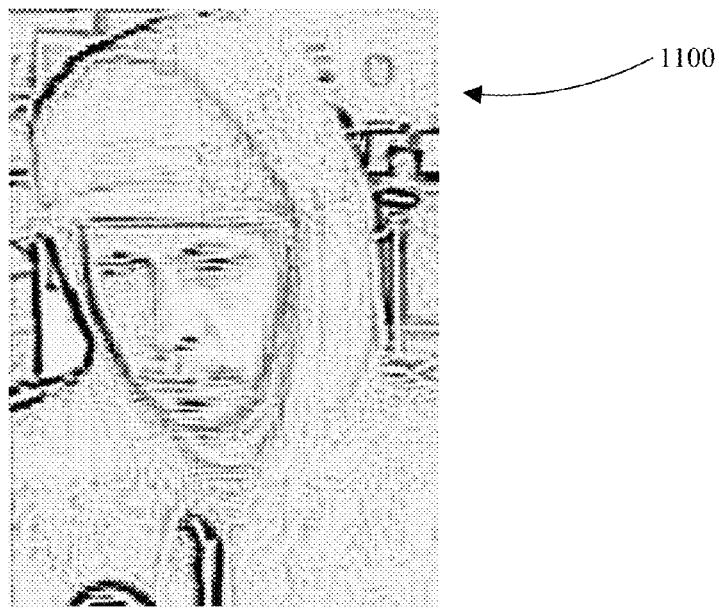
FIG. 11 is a 2D off-angle image of the face of a subject to be identified.

With this example in mind, at step 1005 of method 1000 an off-angle 2D image that contains the face of a subject is received. In the crime example just mentioned, this 2D image is an image that contains an off-angle view of the face of the perpetrator. While not particularly addressed in method 1000, those skilled in the art will readily appreciate that the receipt of the off-angle 2D image can include any processing that needs to be done for readying the image for comparison, such as cropping, sharpening, and/or any other pertinent image processing steps needed. FIG. 11 illustrates an exemplary 2D off-angle image 1100 received at step 1005.

In conjunction with the receiving of the 2D off-angle image at step 1005, at step 1010 one or more appearance-classes are received, for example, using one or more appearance class identifiers. Each of these identifiers denotes one or more appearance classes to which the face of the perpetrator in the image received at step 1005 belongs. Again, an "appearance class" is a class in which, on average, the class members share one or more facial distinctions that are characteristic of that class, and examples of appearance classes and corresponding identifiers are provided above relative to method 100 of FIG. 1. The reader is referred to that section of the disclosure for a detailed description of appearance class and exemplary identifiers that can be implemented at step 1010. In one example, the appearance classes utilized are gender and ethnicity/race.

Figure 12:
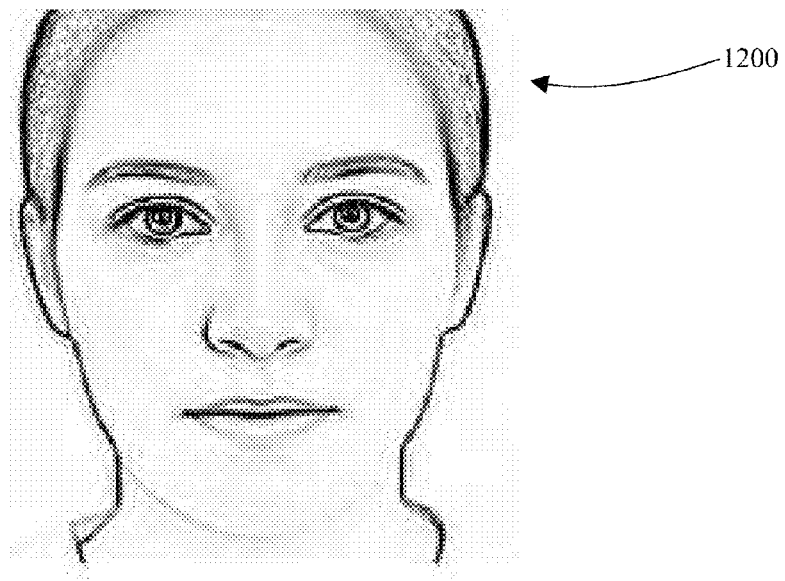
FIG. 12 depicts a 2D frontal face image of potential match to the subject of the 2D image of FIG. 11.

At step 1015, a 2D head-on, or frontal, face image of a subject to be matched to the subject of the 2D off-angle image of step 1005 is received. FIG. 12 illustrates an exemplary 2D frontal face image 1200 that can be received at step 1015. In the context of the criminal investigation scenario posed above as an example, the subject of 2D frontal face image 1200 is a suspect, i.e., a person that might be the perpetrator captured in 2D off-angle-pose image 1100 of FIG. 11. As mentioned above, 2D image 1200 of FIG. 12 is a frontal face image because, as is typical in crime scenarios, the mug shot (here image 1200) of the suspect obtained in connection with a previous arrest contains a frontal face view. Because the 2D image received at step 1005 (e.g., image 1100) is taken from an off-angle vantage point that is different from the head-on vantage point of the 2D image received at step 1015 (e.g., image 1200), conventional image-comparison algorithms will generally not be able to make a reasonable comparison. A more reliable comparison can be made, however, using a 2D off-angle-pose image of the suspect that shows the suspect's face at the same off-angle-pose angle as the angle in the image of the perpetrator. In this example, this off-angle-pose image of the suspect is synthesized using the single 2D frontal image received at step 1015 as described below.

Figure 13:
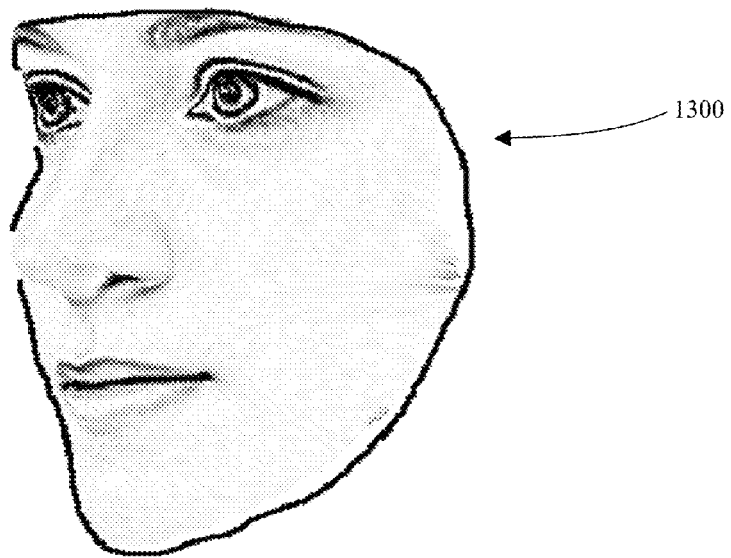
FIG. 13 depicts a 3D model reconstructed from the 2D image of FIG. 12.

At step 1020, a 3D reconstruction of the 2D frontal face image received at step 1015 is generated using the 2D frontal face image and the corresponding appearance class(es) received at step 1010. Step 1020 can be carried out, for example, using steps 110, 115, and 125 to 140 of FIG. 1. As a brief overview of those steps, a 2D mesh is created using facial features contained in the 2D frontal face image, a corresponding 3D mesh is created using a generic AC depth map, and the 2D frontal face image is morphed by transposing the 3D mesh onto the original 2D mesh. FIG. 13 illustrates a 3D reconstructed model 1300 corresponding to input 2D frontal face image 1200 of FIG. 12.

Figure 14:
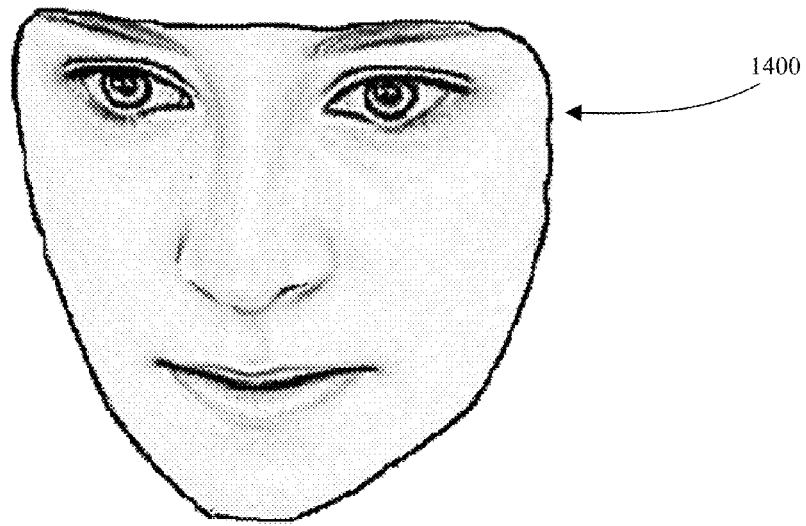
FIG. 14 depicts a synthetic 2D off-angle-pose image created from the 3D model of FIG. 13.

After creating the 3D model at step 1020, at step 1025 a 2D off-angle-pose image is synthesized using the 3D model. Because the synthesized off-angle-pose image created at step 1025 will be used for image matching with the 2D image received at step 1005, the view angle of the synthesized 2D image generated at step 1025 should be as close as possible to the view angle of the 2D image received at step 1005 to give the matching algorithm the best chances for success. As those skilled in the art will readily appreciate, the 3D model created at step 1020 is a virtual model that can be manipulated, for example, rotated and/or translated, in any direction to achieve the necessary pose angle for creating the synthesized 2D off-angle-pose image. Alternatively, the 3D model can remain fixed and the vantage point can be moved as desired to create the requisite synthesized off-angle view. Once the 3D model is at the desired orientation or the vantage point has been moved to the desired position and orientation, a corresponding 2D off-angle-pose image can be created using any suitable techniques for generating a 2D image from a 3D model. FIG. 14 illustrates a synthesized 2D off-angle-pose image 1400 created at step 1025 from reconstructed 3D model 1300 of FIG. 13 that was generated at step 1020 in this example. In the crime suspect scenario introduced above as an example, synthesized 2D off-angle-pose image 1400 of FIG. 14 is the off-angle-pose image of the suspect of input 2D frontal face image 1200 of FIG. 12 that is to be compared to input 2D off-angle image 1100 (FIG. 11) of the perpetrator of the crime caught on camera.

At step 1030, the 2D off-angle image received at step 1005 is compared to the synthesized 2D off-angle image generated from the reconstructed 3D model at step 1025 to determine the likelihood of a match. As just mentioned, the synthesized 2D off-angle image based on the reconstructed 3D model is created at an angle that matches or nearly matches the angle of the 2D off-angle image of step 1005. This helps to ensure that the comparison algorithm used for comparing the two images has the best chance for success. Comparison algorithms that can be used at step 1030 include conventional algorithms developed for comparing and matching 2D images with one another. Those skilled in the art will be familiar with such algorithms, such that a detailed description of any one or more is not necessary for those skilled in the art to implement method 1000 or similar method to its fullest scope.

As noted relative to method 100 of FIG. 1, various ones of the steps of any of the methods specifically disclosed herein and similar methods will typically be implemented using a machine. In the case of step 1030, this step, too, can be implemented using a machine, such as a general purpose computer programmed to implement one or more suitable comparing/matching algorithms. Such a general purpose computer is illustrated relative to computer system 1500 of FIG. 15. In other embodiments, the machine can be an application-specific machine designed and configured for performing any one or more such algorithms.

As those skilled in the art will readily appreciate, a result of the comparison at step 1030 can be, for example, an indication of a match, a non-match, or a probability of a match. Such indication can be communicated to a user of the system or machine performing the comparison. Skilled artisans will also appreciate that steps 1015, 1020, 1025, and 1030 can be repeated as many times as necessary/desired with different 2D frontal images of potential matches until a logical conclusion has been reached. Examples of logical conclusions include finding a match and exhausting all potential matches without finding a match.

FIG. 15 shows a diagrammatic representation of one embodiment of a computer in the exemplary form of a computer system 1500 that contains a set of instructions for implementing any one or more of the aspects and/or methodologies of the present disclosure, including implementing any of the methods of the present disclosure, or portion(s) thereof, such as any of methods 100, 600, and 1000 of FIGS. 1, 6, and 10, respectively, or any portion(s) thereof. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Memory 1508 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable storage media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable storage medium 1528 may provide nonvolatile and/or volatile storage of machine-readable instructions, data structures, program modules, and/or other data for computer system 1500. In one example, software 1520 may reside, completely or partially, within machine-readable storage medium 1528. In another example, software 1520 may reside, completely or partially, within processor 1504. It is noted that the term "machine-readable storage medium" does not include signals present on one or more carrier waves.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540 may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. In addition to a display device, a computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of identifying, using a machine, a subject in an off-angle 2D image that includes the subject's face and is taken at an off-angle, wherein the subject's face has an appearance classification, the method comprising:
   receiving the off-angle 2D image containing the subject to be identified;
   receiving a head-on 2D image containing a face of a potential match to the subject;
   receiving the appearance classification of the subject's face;
   selecting a generic appearance-classification depth map corresponding to the received appearance classification;
   morphing the head-on 2D image as a function of the generic appearance-classification depth map so as to generate a 3D reconstruction of the face of the potential match;
   creating an off-angle 2D image of the face of the potential match as a function of the 3D reconstruction so that the off-angle 2D image of the face of the potential match is at or near the off-angle of the 2D off-angle image containing the face of the subject to be identified; and
   comparing the off-angle 2D image containing the face of the subject to be identified and the off-angle 2D image of the face of the potential match with one another to determine whether or not a match exists.

2. A method according to claim 1, wherein said receiving the appearance classification includes receiving a gender and an ethnicity/race of the subject's face.

3. A method according to claim 1, wherein said selecting the generic appearance-classification depth map includes selecting the generic appearance-classification depth map from among a library of differing generic appearance-classification depth maps.

4. A method according to claim 3, wherein said selecting the generic appearance-classification depth map includes selecting the generic appearance-classification depth map from among a library of differing gender-ethnicity/race depth maps.

5. A method according to claim 1, wherein said morphing includes transposing depth information from the generic appearance-classification depth map to the head-on 2D image.

6. A method according to claim 1, further comprising analyzing the head-on 2D image to identify and locate a set of facial features of the subject's face in the head-on 2D image.

7. A method according to claim 6, further comprising generating a 2D mesh based on the set of facial features in the head-on 2D image.

8. A method according to claim 7, further comprising locating the set of facial features on the selected generic appearance-classification depth map.

9. A method according to claim 8, further comprising generating a 3D mesh based on the set of facial features in the selected generic appearance-classification depth map.

10. A method according to claim 9, wherein said morphing includes transposing depth information from the 3D mesh to the 2D mesh.

11. A method according to claim 10, wherein said transposing includes performing a piecewise affine transform on the 2D mesh.

12. A machine-readable storage medium containing machine-executable instructions for performing a method of identifying, using a machine, a subject in an off-angle 2D image that includes the subject's face and is taken at an off-angle, wherein the subject's face has an appearance classification, said machine-executable instructions comprising:
    a first set of machine-executable instructions for receiving the off-angle 2D image containing the subject to be identified;
    a second set of machine-executable instructions for receiving a head-on 2D image containing a face of a potential match to the subject;
    a third set of machine-executable instructions for receiving the appearance classification of the subject's face;
    a fourth set of machine-executable instructions for selecting a generic appearance-classification depth map corresponding to the received appearance classification;
    a fifth set of machine-executable instructions for morphing the head-on 2D image as a function of the generic appearance-classification depth map so as to generate a 3D reconstruction of the face of the potential match;
    a sixth set of machine-executable instructions for creating an off-angle 2D image of the face of the potential match as a function of the 3D reconstruction so that the off-angle 2D image of the face of the potential match is at or near the off-angle of the 2D off-angle image containing the face of the subject to be identified; and
    a seventh set of machine-executable instructions for comparing the off-angle 2D image containing the face of the subject to be identified and the off-angle 2D image of the face of the potential match with one another to determine whether or not a match exists.

13. A machine-readable storage medium according to claim 12, wherein said third set of machine-executable instructions includes machine-executable instructions for receiving a gender and an ethnicity/race of the subject's face.

14. A machine-readable storage medium according to claim 12, wherein said fourth set of machine-executable instructions includes machine-executable instructions for selecting the generic appearance-classification depth map from among a library of differing generic appearance-classification depth maps.

15. A machine-readable storage medium according to claim 14, wherein said fourth set of machine-executable instructions includes machine-executable instructions for selecting the generic appearance-classification depth map from among a library of differing gender-ethnicity/race depth maps.

16. A machine-readable storage medium according to claim 12, wherein said fifth set of machine-executable instructions includes machine-executable instructions for transposing depth information from the generic appearance-classification depth map to the head-on 2D image.

17. A machine-readable storage medium according to claim 12, further comprising machine-executable instructions for analyzing the head-on 2D image to identify and locate a set of facial features of the subject's face in the head-on 2D image.

18. A machine-readable storage medium according to claim 17, further comprising machine-executable instructions for generating a 2D mesh based on the set of facial features in the head-on 2D image.

19. A machine-readable storage medium according to claim 18, further comprising machine-executable instructions for locating the set of facial features on the selected generic appearance-classification depth map.

20. A machine-readable storage medium according to claim 19, further comprising machine-executable instructions for generating a 3D mesh based on the set of facial features in the selected generic appearance-classification depth map.

21. A machine-readable storage medium according to claim 20, wherein said fifth set of machine-executable instructions includes machine-executable instructions for transposing depth information from the 3D mesh to the 2D mesh.

22. A machine-readable storage medium according to claim 21, wherein said machine-executable instructions for transposing includes machine-executable instructions for performing a piecewise affine transform on the 2D mesh.

* * * * *